(12) United States Patent
Mochizuki et al.

(10) Patent No.: US 7,631,913 B2
(45) Date of Patent: Dec. 15, 2009

(54) MICRO-MANIPULATOR

(75) Inventors: Naoto Mochizuki, Fuefuki (JP); Yoshimichi Yoda, Ymanashi-ken (JP)

(73) Assignee: NISCA CORPORATION, Minamikoma-Gun, Yamanashi (JP)

( * ) Notice: Subject to any disclaimer, the term of this patent is extended or adjusted under 35 U.S.C. 154(b) by 0 days.

(21) Appl. No.: 11/337,686

(22) Filed: Jan. 24, 2006

(65) Prior Publication Data
US 2006/0182606 A1  Aug. 17, 2006

(30) Foreign Application Priority Data
Jan. 31, 2005  (JP) ............... 2005-023983

(51) Int. Cl.
*B66C 1/00* (2006.01)
*B66C 1/42* (2006.01)
*B25J 7/00* (2006.01)

(52) U.S. Cl. .................. 294/103.1; 294/86.4

(58) Field of Classification Search ............. 294/103.1, 294/99.1, 104, 902; 901/31
See application file for complete search history.

(56) References Cited

U.S. PATENT DOCUMENTS

| | | | |
|---|---|---|---|
| 5,163,728 A * | 11/1992 | Miller et al. | 294/103.1 |
| 5,538,305 A * | 7/1996 | Conway et al. | 294/99.1 |
| 5,890,396 A * | 4/1999 | Kaneko et al. | 74/490.01 |
| 6,972,396 B2 * | 12/2005 | Miyazaki | 294/99.2 |
| 7,269,892 B2 * | 9/2007 | Miyazaki | 29/739 |
| 7,390,041 B2 * | 6/2008 | Horie et al. | 294/86.4 |
| 7,564,209 B2 * | 7/2009 | Mochizuki et al. | 318/568.11 |
| 7,568,880 B2 * | 8/2009 | Horie et al. | 294/86.4 |
| 2007/0023999 A1 * | 2/2007 | Horie et al. | 271/277 |

FOREIGN PATENT DOCUMENTS

| | | |
|---|---|---|
| JP | S63-173577 A | 7/1988 |
| JP | S63-272484 A | 11/1988 |
| JP | 2002-187079 A | 7/2002 |
| JP | 2004-276141 A | 10/2004 |
| WO | WO 99/10135 | * 3/1999 |

* cited by examiner

*Primary Examiner*—Paul T Chin
(74) *Attorney, Agent, or Firm*—Manabu Kanesaka

(57) ABSTRACT

A micro-manipulator has a handling mechanism for gripping micro-material with two gripping fingers. The handling mechanism has a fixed finger with an end effecter for touching the micro-material, a movable finger with an end effecter capable of rotating around a rocking shaft for touching the micro-material, and an actuator for rotating the movable finger. The actuator drive moves the movable finger so as to be capable of touching a leading end of the movable finger end effecter to a leading end of the fixed finger end effecter. The micro-manipulator can securely and quickly grip a micro-material in a microscope visual field.

7 Claims, 10 Drawing Sheets

Enlargement

MICRO-MANIPULATOR

CROSS-REFERENCE TO RELATED APPLICATION

The application claims the priority of Japanese Patent Application No. 2005-23983 filed on Jan. 31, 2005, the disclosure of which is incorporated herein as a reference.

BACKGROUND OF THE INVENTION AND RELATED ART STATEMENT

The present invention relates to a micro-manipulator, and particularly to a micro-manipulator provided with a handling mechanism for gripping a micro-material with two gripping fingers.

Conventionally, a micro-manipulator is used for assembling a micro-component and handling a cell. Generally, in order to grip a micro-material, a micro-manipulator has a mechanism for driving (handling mechanism) gripping fingers for handling the micro-material. (See Japanese Patent Publication Kokai No. 08-168979.) Working via a micro-manipulator generally requires viewing the micro-material through a microscope with the naked eye, or viewing an image output to a display via a CCD camera mounted on a microscope. (See Japanese Patent Publication Kokai No. 04-303810.)

As shown in FIGS. 10A to 10C, end effecters 11 and 12 that touch the micro-material in the two gripping fingers are equipped on a conventional micro-manipulator having such a mechanism. A handling mechanism operates so that the positions of the end effecters 11 and 12 have an equal distance to the micro-material 10. The two gripping fingers simultaneously move toward each other to grip the micro-material 10.

To align each of the leading ends of the two gripping fingers (the end effecters), technology is known for preventing mispositioning caused by assembling two gripping fingers composed of one elastic member. (See the example in 2004 *Precision Engineering* Spring Engineering Lecture Bulletin L76.)

However, as shown in FIGS. 10A to 10C, if the positions of the end effecters 11 and 12 are not at equal distances from the micro-material 10, the side of the end effecters closest to the micro-material will come into contact with the micro-material first and push the material toward the other side. If the action for gripping of the end effecters follows a circular locus, the gripping position will be incorrect with regard to the micro-material. Thus, it will be impossible for the end effecters to properly grip the material. (See FIGS. 10D and 10E.)

To avoid this situation, each of the two gripping fingers is independently driven. Therefore, it is necessary to correct phase and time differences that can exist between the two independently driven fingers. This requires the addition of an actuator or clutching mechanism, or other additional mechanisms, which also adds to the difficulty of operation.

Furthermore, there is a limit to the materials that can be used to configure two gripping fingers using one elastic member, and high forming precision has been required. To avoid that situation, the dimensional tolerance must be held down when the gripping fingers and end effecters are composed of a plurality of parts.

Thus, in view of the aforementioned technologies, the present invention provides a micro-manipulator that securely and rapidly grips micro-material within the field of view of a microscope.

Further objects and advantages of the invention will be apparent from the following description of the invention and the associated drawings.

SUMMARY OF THE INVENTION

The present invention has been developed in view of the prior art problems mentioned above. According to a first aspect of the present invention, a micro-manipulator includes a handling mechanism for gripping a micro-material with two gripping fingers. The handling mechanism has an unmovable, fixed finger having an end effecter for touching the micro-material; a movable finger having an end effecter for the micro-material; and an actuator for moving the movable finger. By driving the actuator, the leading end of the movable end effecter moves to come into contact with the leading end of the other, fixed and unmovable end effecter, thereby gripping the micro-material.

In the first aspect, after the fixed end effecter is contacted with the micro-material, the actuator is driven, causing the leading end of the movable end effecter to come into contact with the leading end of the other, fixed end effecter, thereby gripping the micro-material between the end effecters. Therefore, the micro-manipulator of the present invention does not require an additional actuator or a clutching mechanism. The positions of the end effecters with regard to the micro-material being gripped do not need to be readjusted, and it is possible to securely and rapidly grip the micro-material within the visual field of a microscope.

According to the invention, the movable finger can rotate around a rocking shaft. When the movable finger rotates by the drive from the actuator, the leading end of the movable end effecter comes near the leading end of the end effecter of the fixed finger. It is also acceptable for a leading end of a movable end effecter to touch a leading end of an end effecter of a fixed finger.

It is preferable for each end effecter of the fixed finger and the movable finger to have a reduced diameter portion whose diameter tapers toward the leading ends, that is between the fastening locations to the fixed finger and the movable finger and the leading ends thereof. In other words, it is necessary that the diameters of the end effecters of the fixed and movable fingers be of substantially the same dimension as the micro-material in order to be able to get the micro-material and the end effecters of the fixed and movable fingers within the depth of view of the microscope, i.e., to work within the visual field of the microscope.

In doing so, the rigidity of the end effecters also decreases. For example, if it is necessary to work with a micro-material such as a cell in a liquid, a problem may arise that the end effecters bend under the viscous resistance of the liquid. Thus, by forming the areas between the fastening locations and the leading ends of the end effecters of the fixed and movable fingers to have reduced diameters, it is possible to create leading ends having the same dimensions as the micro-material while maintaining a rigid structure.

To increase the contact surface area with the micro-material to securely hold the micro-material, it is preferable for at least one of the end effecters of the fixed and movable fingers to have a sectioned surface cut obliquely to form the sectioned surface of the leading end into an elliptical shape.

However, if the end effecters are to grip a round micro-material, particularly a hard, round material, the contact between the micro-material and the sectioned surface of the leading end of the end effecters would be a single point of contact. This would cause the problem of the micro-material rebounding if the gripping vector is inclined. For example, if at least one of the sectioned surfaces at the leading ends of the end effecters of the fixed and movable fingers is formed into a cavity or a hole, a plurality of points along the ridge of the sectioned surfaces caused by the cavity or hole would touch the micro-material (for example, a hard, ball-shaped object) enabling the end effecters to securely grip the material. In such a case, it is preferable that the size of the cavity or hole formed in at least one of the sectioned surfaces has a diameter that is smaller than the diameter of the micro-material.

Furthermore, the handling mechanism has an adjusting mechanism for adjusting so that the sectioned surfaces of the leading ends of the end effecters of the fixed and movable fingers can touch each other. This makes it possible to align the positions of the sectioned surfaces of the leading ends of the end effecters without the limitations in material as in the conventional technology, or, without having to employ high precision forming techniques.

In this case, it is preferable to make it possible to adjust so that the sectioned surface established on the leading end of at least one of the end effecters of the fixed and movable fingers can oppose the leading end of the other end effecter in a direction for gripping a micro-material with the leading end of the end effecters of the fixed and movable fingers.

By providing a posture changing mechanism for changing the posture of the end effecters of the fixed and movable fingers with regard to the micro-material by rotating the handling mechanism around the center of the leading ends of the end effecters of the fixed and movable fingers, it is possible to change the posture of the end effecters of the fixed and movable fingers with regard to the micro-material and thus more securely and more quickly grip the micro-material.

According to the invention, after the fixed end effecter is contacted with the micro-material, the actuator is driven, causing the leading end of the movable end effecter to come into contact with the leading end of the end effecter of the fixed finger, thereby gripping the micro-material between the end effecters of the fixed and movable fingers. Therefore, no additional mechanisms, such as an actuator or clutching mechanism, are required. It is therefore possible to securely and quickly grip a micro-material within the visual field of a microscope without having to readjust the end effecter positions with regard to the micro-material undergoing the gripping operation.

BRIEF DESCRIPTION OF THE DRAWINGS

FIGS. 7A and 7B are perspective views of the handling unit, wherein FIG. 7A shows a fixed finger side, and FIG. 7B shows a movable finger side;

DETAILED DESCRIPTION OF THE PREFERRED EMBODIMENTS

Hereunder, a micro-manipulator according to the present invention applied to a micro-material handling system for handling a micro-material, such as a cell or a micro-component, will be explained with reference to the accompanying drawings.

System Configuration

Figure 1:
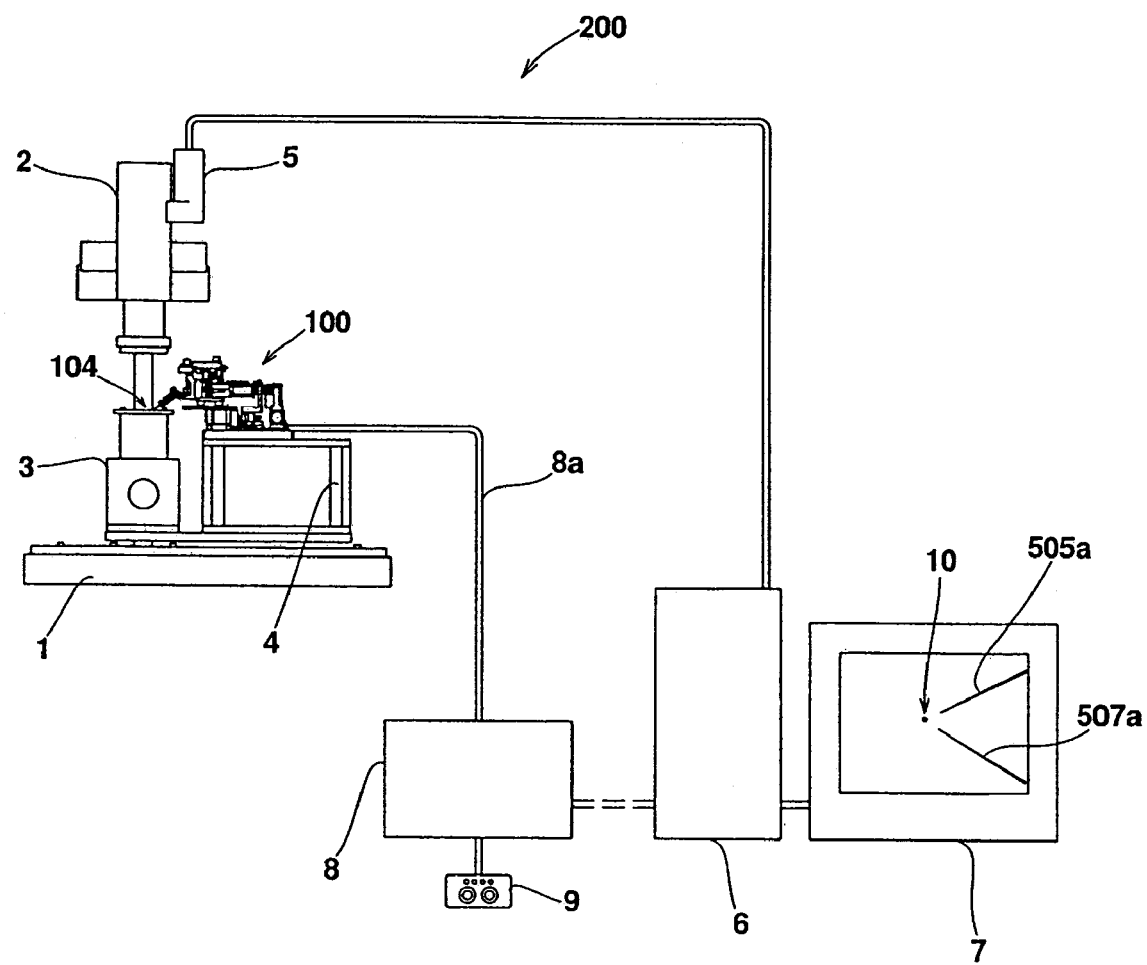
FIG. 1 is a schematic diagram showing a micro-material handling system according to one embodiment of the present invention.

As shown in FIG. 1, the micro-material handling system 200 of the present embodiment has a micro-manipulator 100 for handling micro-material mounted on plate-shaped base 1 via a stand 4; a stage 3 for placing the micro-material to be handled by the micro-manipulator 100; a microscope 2, with a column thereof fastened to the plate-shaped base 1, and mounted with a CCD camera 5; a personal computer (hereinafter referred to as a PC) 6, and a control box 8 embedded with a programmable logic controller (hereinafter referred to as a PLC), for controlling the micro-manipulator 100 as a slave computer of the PC 6.

A cable for input and output with the control box 8, an output cable to a monitor 7 such as a liquid crystal display device, and an input cable from the CCD camera 5 are connected to the PC6. The control box 8 is also connected to the micro-manipulator 100 by a connecting cable 8a, and to a controller (input device) 9 for giving instructions to the PLC of the control box 8. The controller 9 has a joystick and crosshairs button. An operator of the micro-material handling system 200 can look directly through an eyepiece on the microscope 2, or view the micro-material 10 placed on a micro-material stage surface 3 via the monitor 7.

The PLC embedded in the control box 8 has a D/A converter, and an A/D converter in addition to a CPU, ROM and RAM. The PLC 6 receives operating instructions from the PC 6 and sends data detected by an encoder, etc., and the statuses of the actuators to the PC 6 via an interface, such as the interface sold under the registered trademark ETHERNET, according to programs and program data stored in the ROM. The PLC also converts instructions input from the controller 9 into control signals for each actuator, and sends these control signals to the micro-manipulator 100 via the connecting cable 8a.

Figure 2:
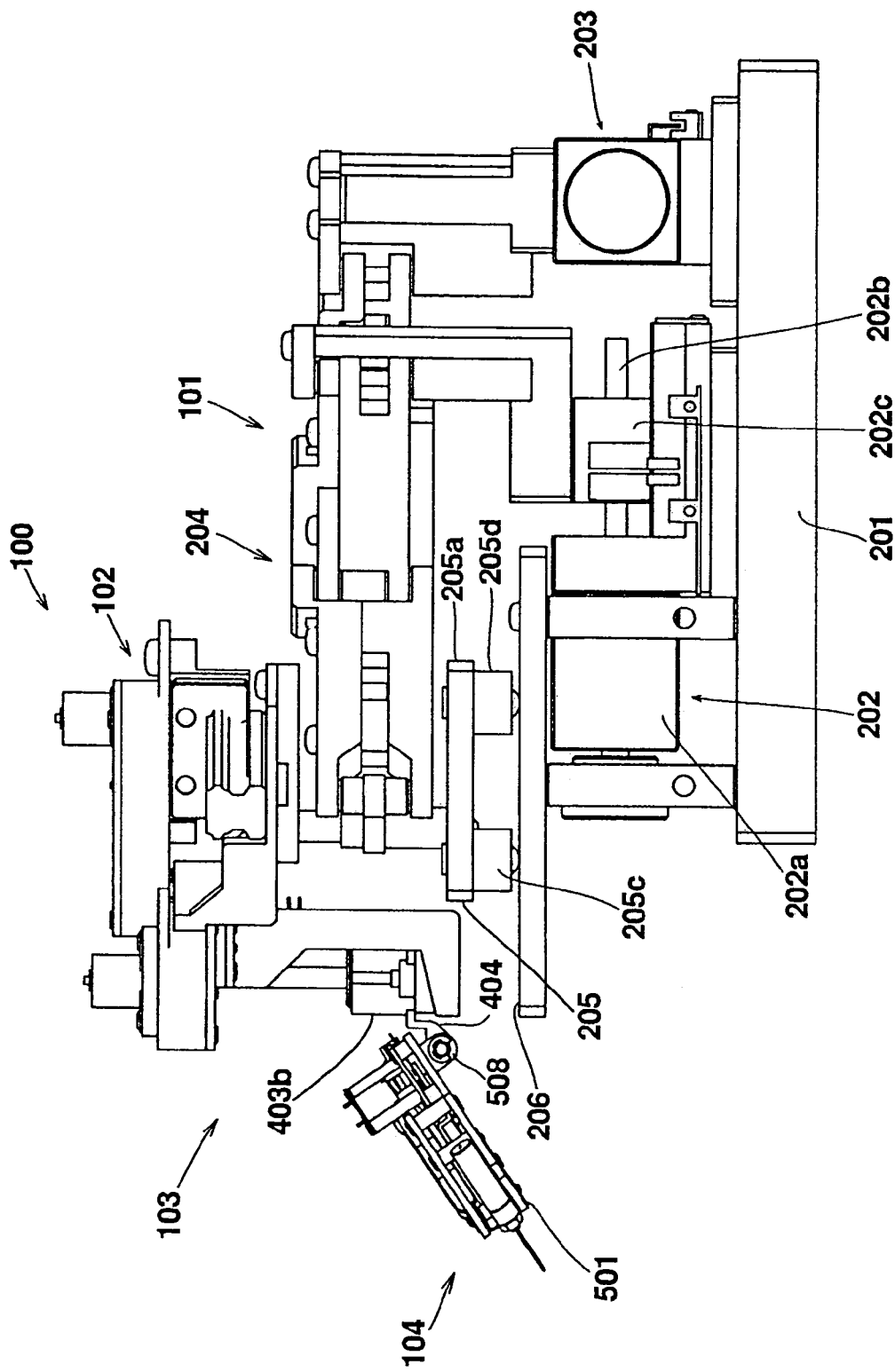
FIG. 2 is a perspective view of a micro-manipulator of the micro-material handling system.
Figure 3:
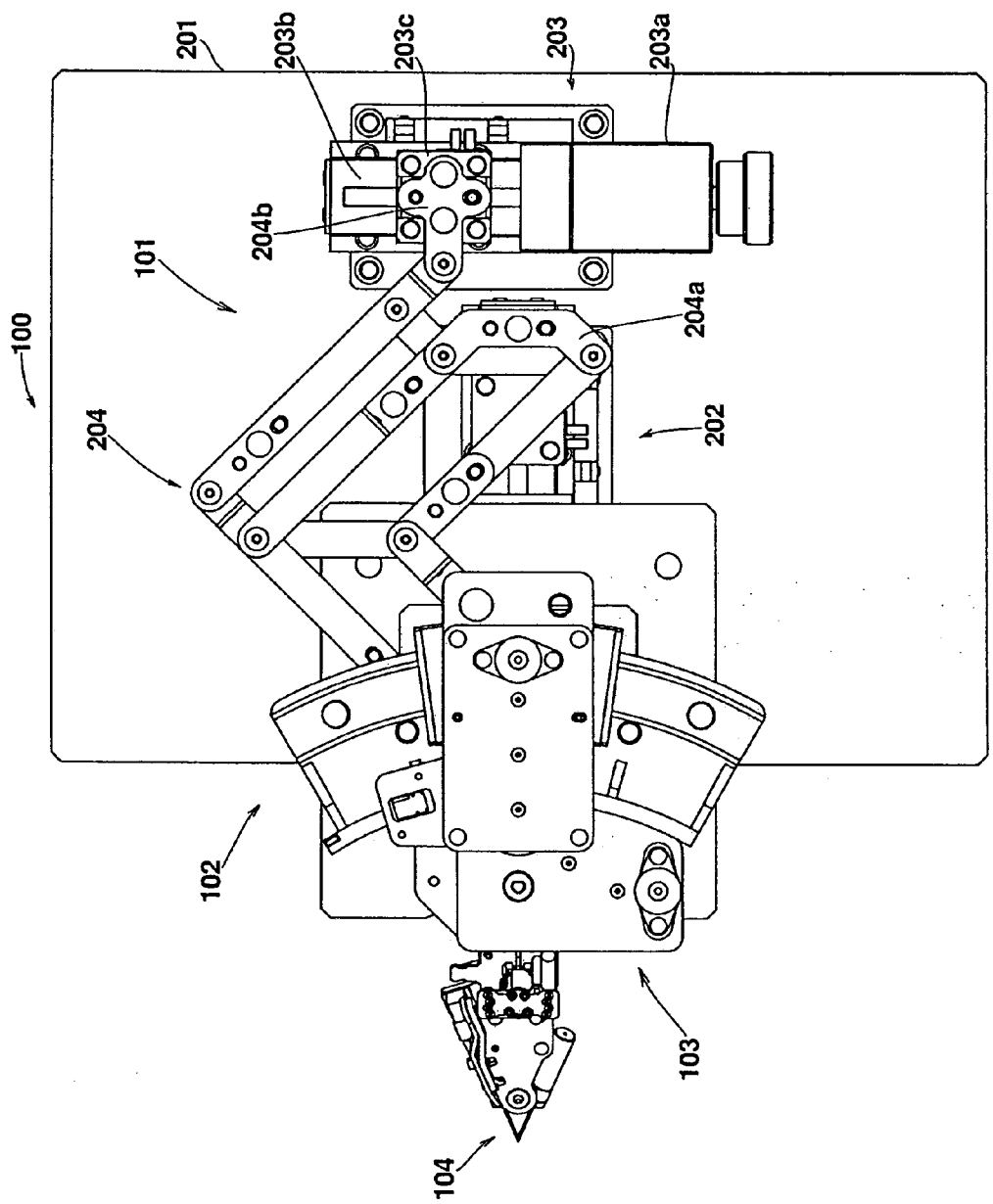
FIG. 3 is a plan view of the micro-manipulator.

As shown in FIGS. 2 and 3, the micro-manipulator 100 is generally composed of a handling unit 104 having gripping fingers (hereinafter referred to as the fixed finger 505 and the movable finger 507), as the handling mechanism for handling (gripping) a micro-material; an XY drive unit 101 for moving the handling unit 104 in X and Y directions; a θZ drive unit 102 for rotating the handling unit 104 using the leading ends of the gripping fingers (hereinafter referred to as the leading ends of the end effecters 505a and 507a) on the handling unit 104 as the center of rotation, for changing the direction of the posture of the gripping fingers on the handling unit 104 with regard to the micro-material placed on the stage 3 and a Z drive unit 103 for moving the handling unit 104 in the Z direction.

XY Drive Unit 101

The micro-manipulator 100 has a plate-shaped base 201 fastened to the stand 4 mentioned above. The base 201 is mounted with an X direction actuator 202 and a Y direction actuator 203 as drive sources for driving the handling unit 104 in the X and Y directions. These actuators are fastened at right angle directions to each other.

The X direction actuator 202 is a linear actuator that has a stepping motor 202a having an encoder and is capable of both forward and reverse drives; a slider 202c that engages a ball screw 202b that is an output shaft of the stepping motor 202a, and formed on the opposite side of the encoder; and a straight guide rail (not shown) enabling the slider 202c to slide. The Y direction actuator 203 also has a slider 203c that engages a ball screw 203b that is an output shaft of the stepping motor 203a, and formed on the opposite side of the encoder; and a straight guide rail (not shown) enabling the slider 203c to slide.

The slider 202c of the X direction actuator 202, and the slider 203c of the Y direction actuator 203 are fastened, respectively, to an X direction input link 204a, and to a Y direction input link 204b of the pantograph mechanism 204. This enables the X direction actuator 202 and the Y direction actuator 203 to apply direct displacement of the X and Y directions to the pantograph mechanism 204.

Figure 4:
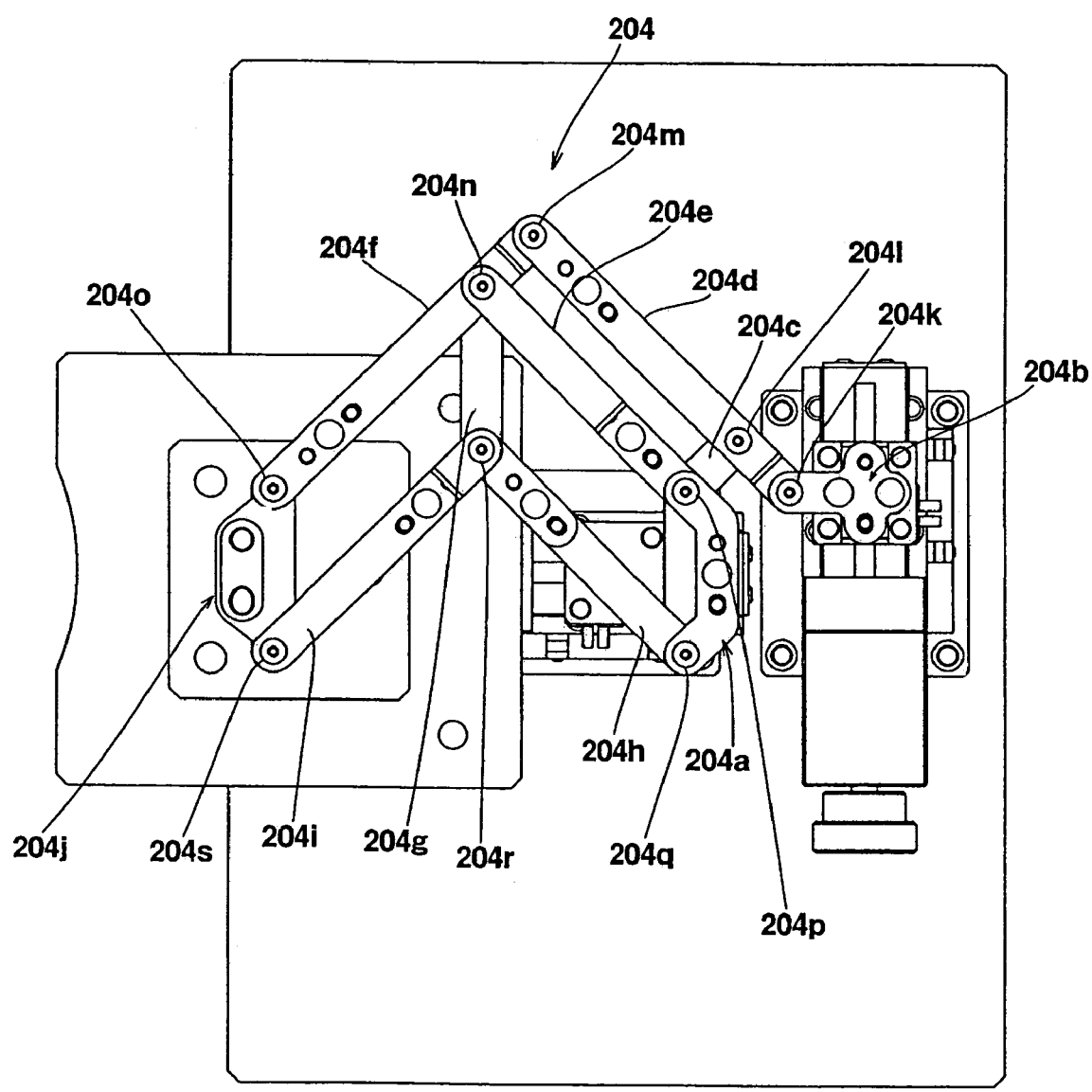
FIG. 4 is a plan view of the micro-manipulator XY drive unit prior to installing a θZ drive unit.

As shown in FIG. 4, a pantograph mechanism 204 has links 204c to 204j and rotating kinematic pairs 204k to 204s for synthesizing the direct displacement of the X and Y directions each input from an X direction actuator 202 and a Y direction actuator 203 in addition to the X direction input link 204a, mentioned above, and the Y direction input link 204b, and outputting to the XY direction output link 204j. Note that a rotating kinematic pair 204k that connects the Y direction input links 204b and 204d, a rotating kinematic pair 204p that connects the X direction input links 204a, 204c and 204e, and a rotating kinematic pair 204q that connects the X direction input links 204a, and 204h are each fastened.

Figure 5:
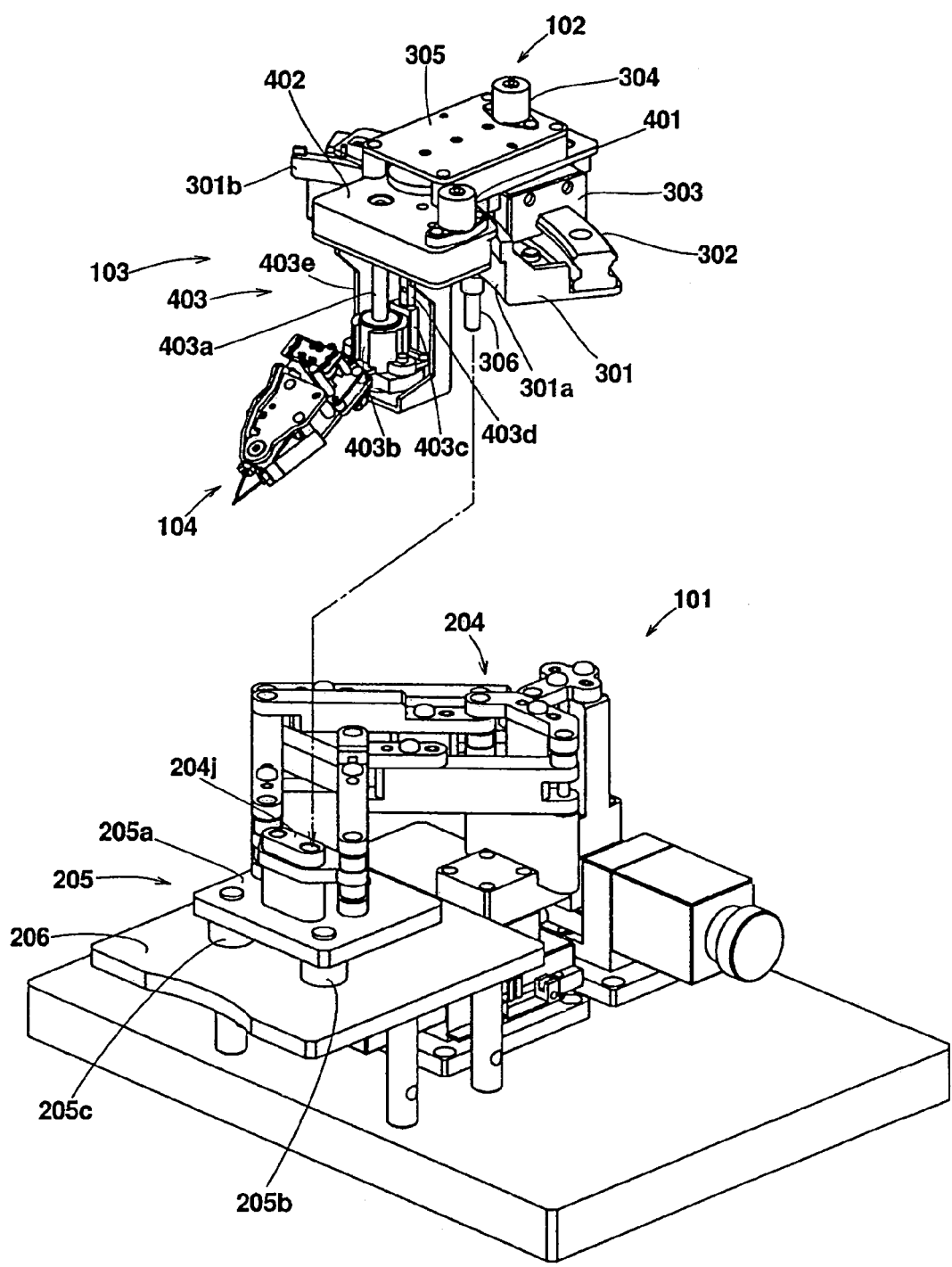
FIG. 5 is a perspective view of part of the micro-manipulator disassembled.

As shown in FIG. 5, the pantograph mechanism 204 is arranged above the X direction actuator 202 and the Y direction actuator 203 so that it does not interfere with them. The X Y direction output link 204j is fastened to the flat, plate-shaped base 205a. The base 205a has three leg units of 205b, 205c and 205d. Rotatable balls are fit inside the leading ends of the three leg units of 205b, 205c and 205d in any direction. (Also see FIG. 2.) The rotating balls fit inside of the three leg units of 205b, 205c and 205d touch a surface 206 that has a substantially flat surface wider than the base 205. The surface 206 is fastened to the base 201, described above, by four legs so that it straddles the X direction actuator 202. Also, two engaging holes for engaging and fastening the θZ drive unit 102 are formed in substantially the center of the XY direction output link 204j.

θZ Drive Unit 102

As shown in FIG. 5, the θZ drive unit 102 has a base 301. Two rod-shaped linking members 306 project downward from the base 301. These linking members 306 are pressed into and engage the engaging holes formed in the XY direction output link 204j. Therefore, the XY drive unit 101 and the θZ drive unit 102 are linked. An arc-shaped guide rail 302 is fastened to the base 301. A slidable slider 303 engages the guide rail 302 from above the guide rail 302. The leading ends of the gripping fingers 104 (end effecters 505a and 507a) on the handling unit 104 match the center of the arc of the guide rail 302.

A stepping motor 304, and a gear box 305 composed of a first deceleration gear train, not shown, for decelerating rotational drive from the stepping motor 304 are fastened to the slider 303. An arc-shaped wall surface 301a is formed in a concentric circle with the guide rail 302 on the Z drive unit 103 (handling unit 104) side on the base 301. Internal gear 301b that protrudes from the arc-shaped wall surface 301a to the Z drive unit 103 (handling unit 104) side is unitized to the upper side of the arc-shaped wall surface 301a of the base 301. A pinion structure, not shown, is established on the output end of the first deceleration gear train of the gear box 305. This pinion engages the internal gear 301b. Therefore, drive force (rotational torque) from the stepping motor 304 decelerated by the first deceleration gear train is transmitted via the pinion of the first deceleration gear train to the internal gear 301b.

Z Drive Unit 103

The Z drive unit 103 is composed of a stepping motor 401 capable of both forward and reverse drives; a gear box 402 composed of a second deceleration gear train, not shown, for decelerating the drive force from the stepping motor 401; and a Z direction direct drive mechanism 403 including a ball screw 430a; a nut 403b; a slider 403c; guide rail 430d and a holder 403e.

The gear box 305 of the θZ drive unit 102 is unitized to the gear box 402. The stepping motor 401 is fastened to the gear box 402. The ball screw 403a projected downward is disposed on the output end of the second deceleration gear train of the gear box 402. The leading end of the ball screw 403a is rotatably supported on a holder 403e fastened to the gear box 402. The nut 403b is screwed onto the ball screw 403a. The slider 403c is fastened to the nut 403b. The straight guide rail 403d is disposed to be parallel with the ball screw 403a from the gear box 402. The leading end of the guide rail 403d is fastened to the holder 403e. The slider 403c slidably touches the guide rail 403 from thereabove.

Handling Unit 104

As shown in FIG. 2, a linking member 404 formed with a penetration hole, formed at the leading end of the handling unit 104 is fastened to the nut 403b of the Z direction direct drive mechanism 403. The handling unit 104 is fastened to the Z drive unit 103 by a linking pin 508 that penetrates two holes formed in the bottom of the base 501 (see FIG. 6), and a hole formed in the leading end of the handling unit 104 side of the linking member 404.

Figure 6:
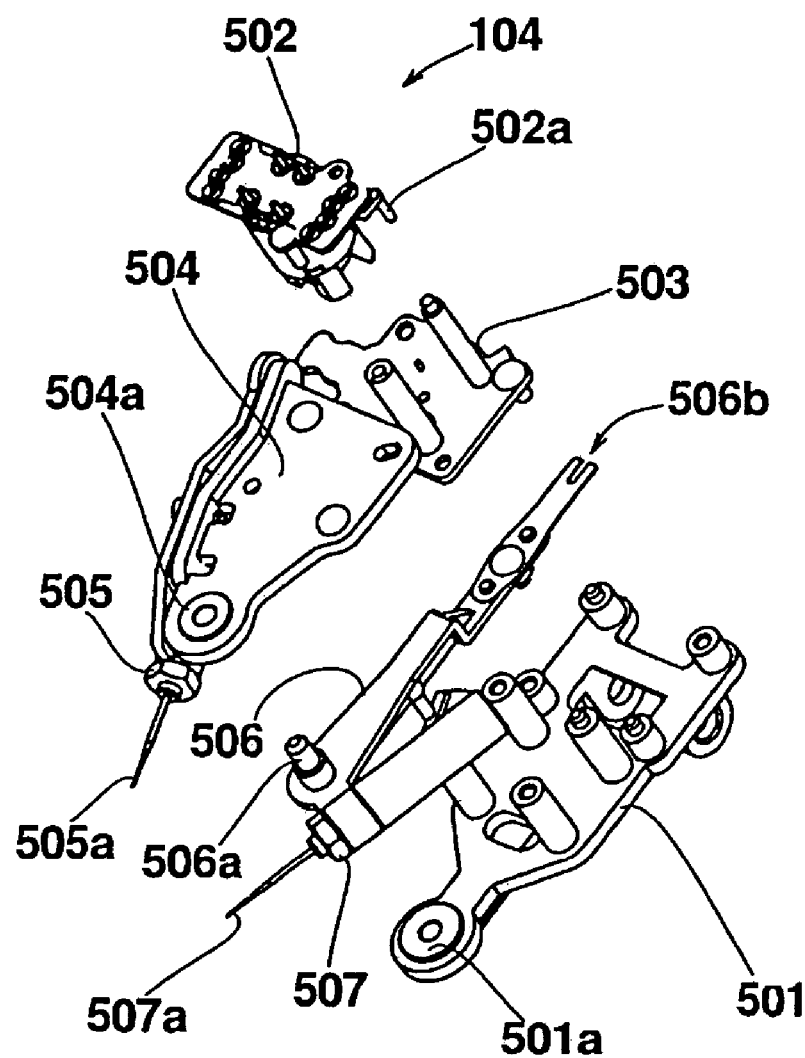
FIG. 6 is an exploded perspective view of a micro-manipulator handling unit.

As shown in FIG. 6, the handling unit 104 has two gripping fingers, namely the fixed finger 505 and the movable finger 507, for gripping micro-material. The end effecters 505a and 507a are installed on the fixed finger 505 and the movable finger 507 for touching micro-material.

An actuator 502, such as a meter, is fastened to the base 501 of the handling unit 104 along with a bracket 503. The fixed finger 505 is assembled (or fastened) into a plate 504. The plate 504 is fastened to the base 501 forming a gap thereto when the fixed finger 505 is assembled. A long, plate-shaped lever 506 interposes this gap. The movable finger 507 is fastened to one side of the leading end of the lever 506 (an opposite side of the Z drive unit 103), and a rocking shaft 506a projects in both the upward and downward directions in the center of the leading end thereof. The rocking shaft 506a is supported by the bearing 504a of the plate 504 and the bearing 501a of the base 501.

A substantially U-shaped slit (notch) 506b is formed in the trailing edge of the lever 506. An output pin 502a of the actuator 502 engages this slit 506b. Therefore, as the actuator 502 drives, the output pin 502a engaging the U-shaped slit 506b pushes the trailing edge of the lever 506 laterally, so that the lever 506 rotates around the rocking shaft 506a thereby moving the end effecter 507a on the movable finger 507 toward and away from the end effecters 505a of the fixed finger 505. This action makes it possible for the end effecters 505a and 507a to grip and to release a micro-material.

Figure 7A:
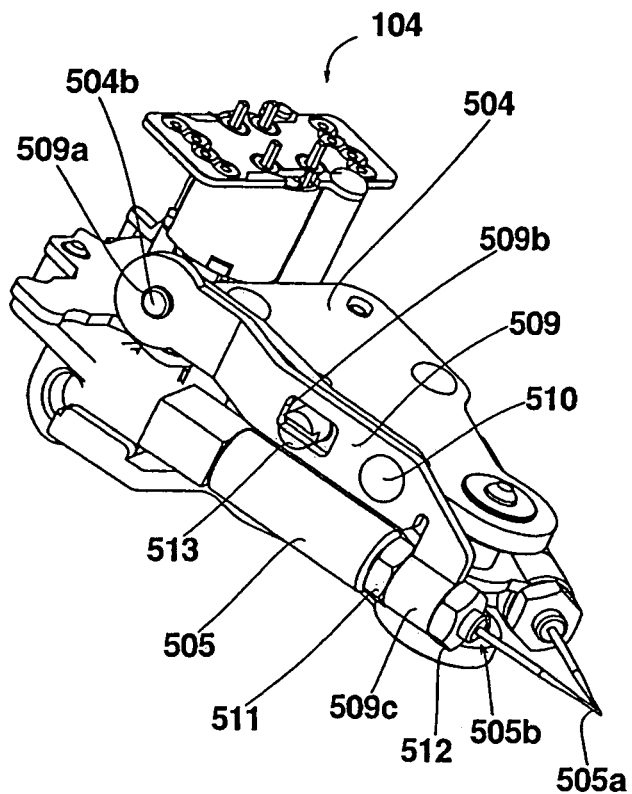

As shown in FIG. 7(A), a boss 504b is implanted in the plate 504. The boss 504b penetrates a round hole 509a formed in one side (the Z drive unit 103 side) of a lever 509. The lever 509 is supported on the boss 504b. A sleeve 509c is unitizingly formed to the other side of the lever 509, and a screw unit 505b is held for fastening the end effecter 505a of the fixed finger 505 to the sleeve 509c.

A rectangular slit 509b is formed in substantially the center of the lever 509. An eccentric pin 513 supported by the plate 504 engages this slit 509b. The lever 509 is fastened to the plate 504 by a screw 510 via a hole, not shown. The screw unit 505b of the fixed finger 505 is composed of two nuts, namely nut 511 and nut 512. These nuts 511 and 512 are disposed to sandwich the sleeve 509c of the lever 509.

Figure 7B:
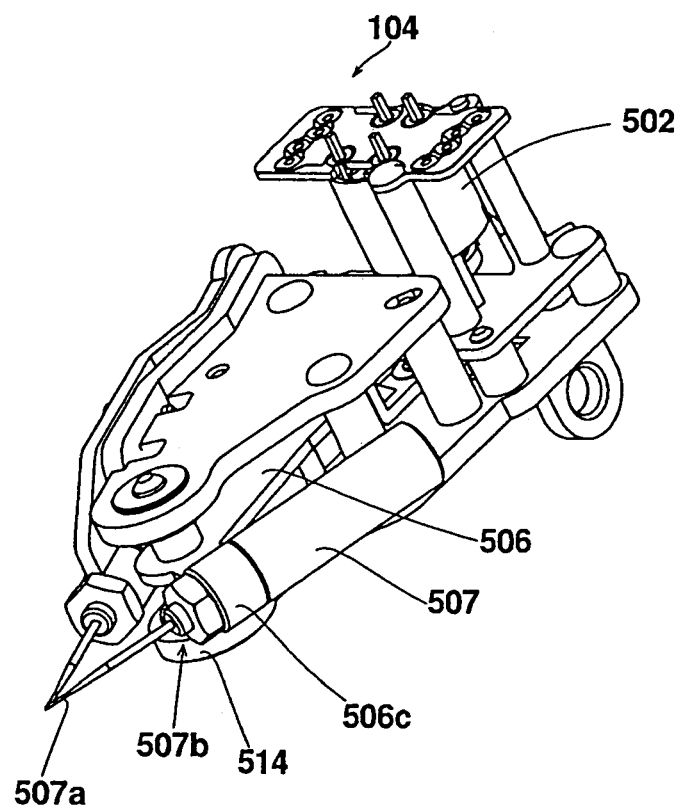

As shown in FIG. 7B, a screw 507b of the movable finger 507 is inserted into a sleeve 506c unitizingly formed on a lever 506, and the end effecter 507a is fastened by a nut 514.

Figure 8:
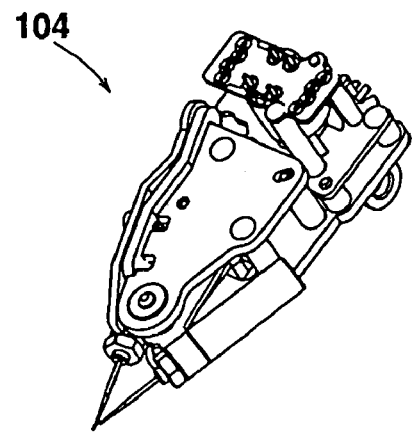
FIG. 8 is a partially expanded perspective view of end effecters of the fixed finger and movable finger on the handling unit.
Figure 8:
Figure 8:
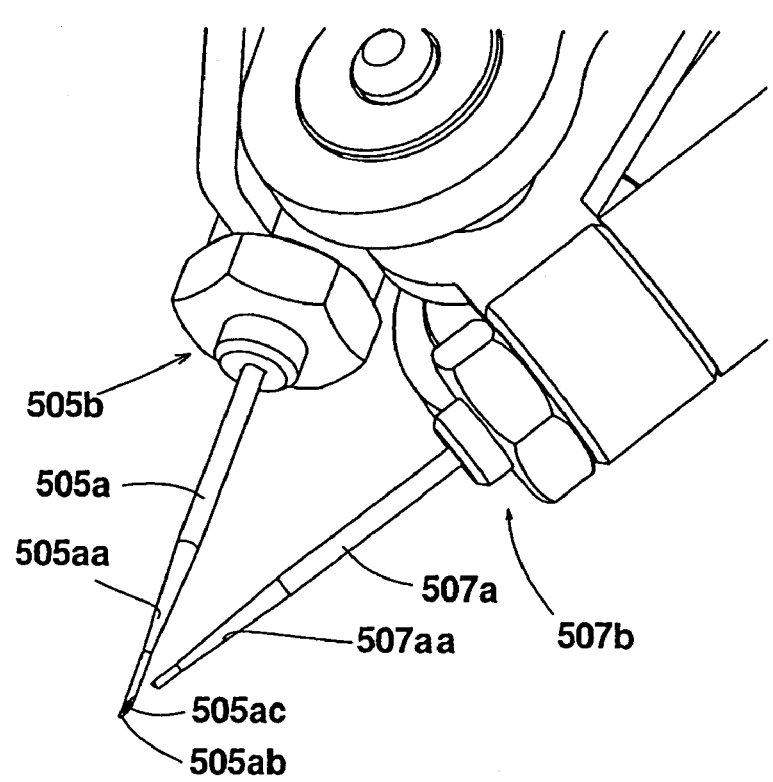

As shown in FIG. 8, each end effecter 505a and 507a has a reduced diameter portion 505aa and 507aa. The diameters of these portions are tapered toward the leading ends of the end effecters 505a and 507a between the leading ends of the end effecters 505a and 507a and the screws 505b and 507b (fixed positions).

Furthermore, the end effecters 505a and 507a have sectioned surfaces (gripping surfaces on the leading end) 505ab and 507ab (507ab not shown) that are obliquely cut to form the sectional surfaces into an oval-shape at the leading end of the end effecters 505a and 507a. The sectioned surfaces 505ab and 507ab are configured to come into contact with each other. Still further, holes (cavities) 505ac, and 507ac (507ac not shown) are formed in the sectioned surfaces 505ab and 507ab. Note that in FIG. 8, the end effecters 505a and 507a are symmetrically shaped with regard to the sectioned surfaces 505ab and 507ab, so for convenience sake, the end portion of the end effecter 507a is not shown.

The handling unit 104 has an adjusting mechanism for adjusting so that the sectioned surfaces 505ab and 507ab at the leading ends of the end effecters 505a and 507a can touch each other. The following will describe a procedure for making the sectioned surfaces 505ab and 507ab touch each other using this adjusting mechanism.

As shown in FIG. 7B, a screw 507b of the movable finger 507 is inserted into a sleeve 506c of a lever 506. After rotating to align the sectioned surface 507ab, the end effecter 507a is fastened by a nut 514. Next, as shown in FIG. 7A, a nut 511 is inserted into the screw unit 505b of the fixed finger 505 assembled into the screw unit 505b in the sleeve 509c of the lever 509 in advance.

The direction and position of an insertion direction of the sectioned surface 505ab are rotated to align with the sectioned surface 507ab. After adjusting using the nut 511, this is fastened using the other nut 512. Next, after adjusting the position of the lever 509 by loosening the screw 510 and rotating the lever 509 around the pivot point of the boss 504b, then refastening using the screw 510, the sectioned surfaces 505ab and 507ab of the end effecters 505a and 507a can be made to touch each other.

Therefore, the adjusting mechanism of the handling unit 104 can adjust so that sectioned surface 505ab of the end effecter 505a can touch the sectioned surface 507ab of the end effecter 507a with the two directions at right angles to the direction for the end effecters 505a and 507a of the fixed finger 505 and the movable finger 507 to grip the micro-material, and can adjust the direction that the section surfaces 505ab and 507ab face.

Operations

Next, the functions of the micro-material handling system 200 of this embodiment of the present invention will be described focusing on the operation of the micro-manipulator 100.

Initially, an operator will bring the micro-material 10 placed on the stage 3 and the end effecters 505a and 507a of the handling unit 104 into view on the monitor 7 screen via the microscope 2, the camera 5 and the PC 6, as shown in FIG. 1. In this state, the operator provides instructions to the micro-manipulator 100 via the PLC of the control box 8 from the controller 9 for the X, Y, θZ directions (the rotating direction of the handling unit 104 centering on the leading ends of the end effecters 505a and 507a, in other words, the direction of the posture of the end effecters 505a and 507a), the Z direction and for handling (opening and closing) to the grippers. This controls the relative positional relationships of the micro-material 10 and end effecters 505a and 507a.

X Direction Drive

As shown in FIGS. 2 to 4, when an operating signal is applied to the X direction actuator 202, the stepping motor 202a rotates the ball screw 202b to move the X direction input link 204a of the pantograph mechanism 204 in the horizontal direction (X direction) of FIG. 3, via the slider 202c. As described above, the rotating kinematic pair 204k is fastened, so the displacement of the rotating kinematic pair 204p expands the positions of the rotating kinematic pairs 204k to 204s in a similarity ratio of Δklp:Δkmo (if using only the letters of the alphabet of each pair) and is output to the rotating kinematic pair 204o to displace (or move) the rotating kinematic pair 204o. Note that the links 204g, 204h, and 204i are links added to form two parallelogram groups and have a function for holding the position of the XY direction output link 204j at a constant.

Y Direction Drive

When an operating signal is applied to the Y direction actuator 203, the stepping motor 203a rotates the ball screw 203b to move the Y direction input link 204b of the pantograph mechanism 204 in the vertical direction (Y direction) of FIG. 3, via the slider 203c. As described above, the rotating kinematic pair 204p is fastened, so the displacement of the rotating kinematic pair 204k expands the positions of the rotating kinematic pairs 204k to 204s in a similarity ratio of Δklp:Δonp (if using only the letters of the alphabet of each pair) and is output to the rotating kinematic pair 204o to displace (or move) the rotating kinematic pair 204o, as explained above.

X Y Direction Drive

As described above, when the XY direction output link 204j of the pantograph mechanism 204 is displaced (moved) by input in the X and Y directions, the weights of the θZ drive unit 102, the Z drive unit 103 and the handling unit 104 act in the Z direction on the XY direction output link 204j via the linking member 306, but a bearing surface 206 receives that load via the legs 205b to 205d of the base 205. Balls that rotate in any direction are embedded in the leading ends of the legs 205b to 205d, so they can roll over the bearing surface 206 to enable a low friction movement without receiving the load of the Z direction on the pantograph mechanism 204. Said another way, the XY slider is composed of the base 205 fastened to the XY direction output link 204j (unitized to the XY direction output link 204j), and the legs 205b to 205d.

θZ Direction Drive

As shown in FIG. 5, when a drive signal is applied to the stepping motor 304, torque is transmitted to a pinion (not shown) arranged at an output end of a first deceleration gear train of the gear box 305, and a slider 303 rotates along the guide rail 302 in a planetary gear shape by an engaging internal gear 301b of the base. The gear box 305 and slider 303 are unitized. So are the gear box 305 and gear box 402. A holder 403e (Z direction direct drive mechanism 403) is fastened to the gear box 402, and a linking member 404 is fastened to the nut 403b of the Z direction direct drive mechanism 403. The handling unit 104 is fastened to the Z direction direct drive mechanism 403 (Z drive unit 103) by a linking pin 508, so when the stepping motor 304 drives, the Z drive unit 103 and the handling unit 104 rotate centering on the leading ends of the (the leading ends of the end effecters 505a and 507a) of the gripping fingers of the handling unit 104 along with the rotation of the θZ drive unit 102.

Z Direction Drive

As shown in FIG. 5, when a drive signal is applied to the stepping motor 401, the stepping motor 401 rotates the ball screw 403a via a second deceleration gear train arranged at the gear box 402. This moves the handling unit 104 that is unitized to the nut 403b in the up and down directions (Z direction) of FIG. 5 along the guide rail 403d.

Grip Drive

Figure 9A:
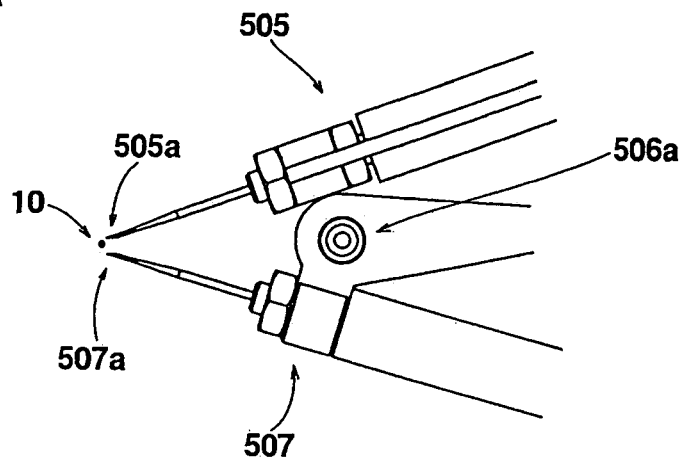
FIGS. 9A to 9C show operations of the fixed and movable end effecters of the handling unit gripping a micro-material.
Figure 9B:
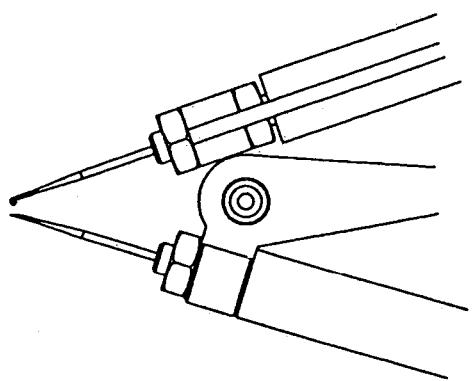
Figure 9C:
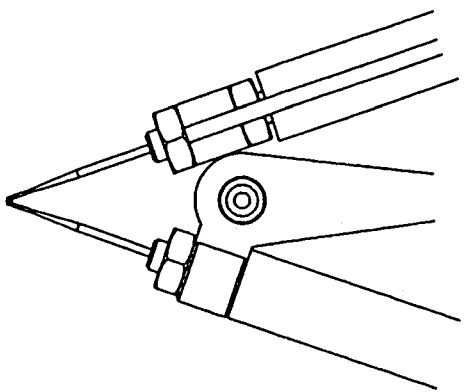
Figure 10A:
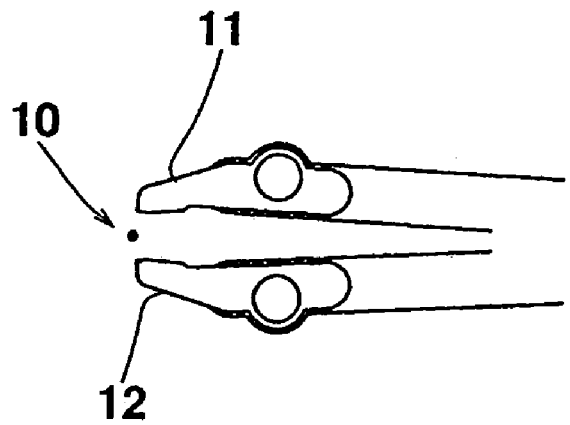
FIGS. 10A to 10E show operations of the fixed and movable end effecters of a prior art handling unit gripping a micro-material.
Figure 10B:
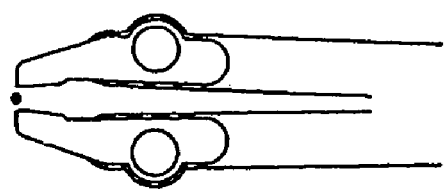
Figure 10C:
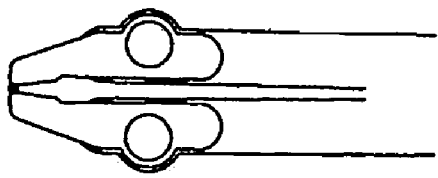
Figure 10D:
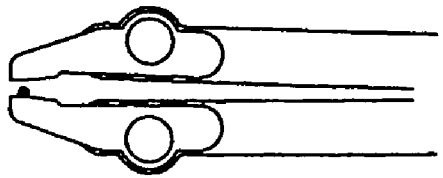
Figure 10E:
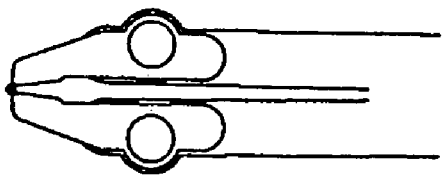

As described above, the XY drive unit 101, θZ drive unit 102, and Z drive unit 103 drive to position the end effecters 505a and 507a near the micro-material 10. (See FIG. 9A.) Next, the XY drive unit 101, θZ drive unit 102, and Z drive unit 103 drive to touch the sectioned surface 505ab of the leading end of the end effecter 505a to the micro-material 10, and starts a gripping operation by applying a drive signal to the actuator 502. (See FIG. 9B.)

As shown in FIG. 6, by applying a drive signal to the actuator 502 to bring the end effecters 505a and 507a close together, the output pin 502a becomes displaced which is transmitted to the slit 506b of the lever 506 and the lever 506 revolves around the rocker shaft 506a. This causes the end effecter 507a of the movable finger 507 to move close to the end effecter 505a of the fixed finger 505.

Then, the micro-material 10 is gripped by the sectioned surfaces 505ab and 507ab each formed with holes (cavities) 505ac and 507ac on the end effecters 505a and 507a. Note that when a drive signal is applied to the actuator 502 to separate the end effecters 505a and 507a, the end effecters 505a and 507a that gripped the micro-material 10 separate to release the gripped micro-material 10.

Actions

Next, the actions of the micro-material handling system 200 of this embodiment of the present invention will be described focusing on the actions of the handling unit 104 of the micro-manipulator 100.

With the micro-manipulator 100 applied to the micro-material handling system 200 of the present embodiment, after touching the end effecters 505a of the fixed finger 505 to the micro-material 10, drive of the actuator 502 rotates the movable finger 507 around the rocking shaft 506a moving the sectioned surface 507ab of the end effecters 507a of the movable finger 507 into contact with the sectioned surface 505ab of the end effecters 505a of the fixed finger 505 to grip the micro-material 10 between the sectioned surfaces of 505ab and 507ab.

Therefore, the micro-manipulator 100 of the present invention does not require an additional mechanism such as an actuator or a clutching mechanism to correct the phase difference or time differences between fingers. The positions of the end effecters with regard to the micro-material being gripped do not need to be readjusted, and it is possible to securely and rapidly grip the micro-material within the visual field of a microscope.

Also, the micro-manipulator 100 is equipped with the θZ drive unit 102 for rotating the handling unit 104 around (the mid-point therebetween) the leading ends of the end effecters 505a and 507a of the fixed finger 505 and the movable finger 507, so it is possible to change the posture of the end effecters 505a and 507a of the fixed finger 505 and the movable finger 507 with regard to the micro-material, so the system can securely and quickly pick up the micro-material.

Also, the micro-manipulator 100 has the tapered (reduced diameter) portions 505aa and 507aa at the leading ends of the end effecters 505a and 507a of the fixed finger 505 and movable finger 507. For that reason, it is possible to make the sectioned surfaces 505ab and 507ab of the leading end of the of the end effecters 505a and 507a the same dimensional level as the micro-material 10. It is also possible to get (to focus) the leading end portions including the sectioned surfaces 505ab and 507ab of the end effecters 505a and 507a and the micro-material 10 even if the depth of focus of the microscope is shallow (see FIG. 1), and to maintain a rigidity of the end effecters 505a and 507a.

Also, the micro-manipulator 100 has the sectioned surfaces 505ab and 507ab on the leading ends of the end effecters 505a and 507a of the fixed finger 505 and movable finger 507, and these sectioned surfaces 505ab and 507ab are configured to be able to touch each other. For that reason, it is possible to increase the contact surface area with the micro-material 10 to securely hold the micro-material 10 by the sectioned surfaces 505ab and 507ab.

Still further, holes (cavities) 505ac, and 507ac are formed in the sectioned surfaces 505ab and 507ab. A plurality of points on ridges of these sectioned surfaces 505ab and 507ab formed at the holes (cavities) 505ac and 507ac touch the micro-material 10 and thereby securely grip the micro-material. For example, it is possible to securely grip a micro-material even if the micro-material is ball-shaped, or if gripping a hard ball-shaped material.

Furthermore, the micro-manipulator 100 has an adjusting mechanism for adjusting so that the sectioned surfaces 505ab and 507ab of the leading ends of the end effecters 505a and 507a of the fixed finger 505 and movable finger 507 can touch each other. This mechanism adjusts so that the sectioned surface 505ab of the end effecter 505a can touch the sectioned surface 507ab of the end effecter 507a in two directions that are orthogonal to the direction for the sectioned surfaces 505ab and 507ab of the end effecters 505a and 507a to grip the micro-material 10, and the orientation of the sectioned surfaces 505ab and 507ab.

For that reason, there is virtually no limit to the materials that can be manipulated (contrary to the conventional manipulators). And, it is not necessary for precision forming to enable the sectioned surfaces of the leading ends of the end effecters to be aligned with each other.

Furthermore, it is preferred that the caliber of the holes (cavities) 505ac and 507ac be smaller than the diameter of the micro-material 10.

The micro-manipulator 100 is so adjustable that a plurality of spare end effecters 505a and 507a can be prepared in advance to be able to use the end effecters that are appropriate for the dimension of the micro-material 10.

Note that according to the present invention, an example was provided for moving the handling unit 104 in the X, Y, Z, and θZ directions. However, such a configuration is not limited to this embodiment, and it is acceptable to move the stage 3 in three dimensional directions or to correspond to the posture of the end effecters 505a and 507a and apply that to a micro-material handling system.

Also, the present embodiment of the invention described using an actuator 502 to rotate the movable finger 507 around a rocking shaft 506a. The configuration is not limited to that. It is also acceptable to configure the system to slide the movable finger 507 to narrow the distance between the end effecters 505a and 507a (to bring the leading end of the end effecters 507a near to the leading end of the of the end effecters 505a).

And, according to the above-described embodiment of the present invention, holes (cavities) 505ac and 507ac are formed in both of the sectioned surfaces 505ab and 507ab of the leading ends of the end effecters 505a and 507a. But, it is also possible to form a hole in only one of the sectioned surfaces and still attain the same desired effect (i.e., the secure gripping of a micro-material).

Still further, according to this embodiment of the present invention, the adjusting mechanism of the handling unit 104 can adjust so that sectioned surface 505ab of the end effecter 505a can touch the sectioned surface 507ab of the end effecter 507a with the two directions that are at right angles to the direction for the end effecters 505a and 507a of the fixed finger 505 and the movable finger 507 to grip the micro-material, and the direction that the section surfaces 505ab and 507ab face. However, it is also acceptable to adjust so that the sectioned surface 507ab of the end effecters 507a can touch the sectioned surface 505ab of the end effecters 505a or to adjust both sectioned surfaces. It is also possible to configure the manipulator so that both sectioned surfaces 505ab and 507ab touch.

The present invention can find many applications for use in industry. The invention provides a micro-manipulator that is capable of securely and quickly gripping a micro-material within a visual field of a microscope. Therefore, it has the possibility for use in industry because it contributes to the manufacture, sales, and use of a micro-manipulator.

What is claimed is:

1. A micro-manipulator with a handling mechanism for gripping a micro-material, the handling mechanism comprising:
    a fixed finger having a fixed finger end effecter with a leading end for touching the micro-material;
    a movable finger having a movable finger end effecter with a leading end for touching the micro-material, at least one of the leading ends of the fixed finger end effecter and the movable finger end effecter having an oblique flat surface with an oval shape for touching the micro-material;
    an adjustment mechanism formed at the fixed finger and the movable finger, said adjustment mechanism adjusting locations of the leading ends of the fixed finger end effecter and the movable finger end effecter and adjusting a posture of the oblique flat surface, with respect to the micro-material, formed at the at least one of the fixed finger end effecter and the movable finger end effecter so that the oblique surface substantially entirely contacts the micro-material; and
    an actuator with a drive for moving the movable finger, wherein the drive moves the leading end of the movable finger end effecter so as to be capable of approaching the leading end of the fixed finger end effecter, thereby gripping the micro-material between the leading ends of the fixed finger end effecter and the movable finger end effecter,
    wherein each of the fixed finger end effecter and the movable finger end effecter has an oblique flat surface with an oval shape, and at least one of the oblique flat surface of the fixed finger end effecter and the movable finger end effecter has a cavity or a hole therein to hold the micro-material between the leading ends of the fixed finger end effecter and the movable finger end effecter, and
    wherein the movable finger is capable of rotating around a rocking shaft, and the drive rotates the movable finger so as to be capable of approaching the leading end of the movable finger end effecter toward the leading end of the fixed finger end effecter to hold.

2. The micro-manipulator according to claim 1, wherein the cavity or hole has a diameter smaller than a diameter of the micro-material.

3. The micro-manipulator according to claim 1, wherein the fixed finger end effecter has a reduced diameter portion that tapers from a first fixed finger end effecter section toward the leading end of the fixed finger end effecter, and the movable finger end effecter has a reduced diameter portion that tapers from a first movable finger end effecter section toward the leading end of the movable finger end effecter.

4. The micro-manipulator according to claim 1, wherein said at least one of the oblique flat surface of the fixed finger end effecter and the movable finger end effecter has the hole therein to hold the micro-material between the leading ends of the fixed finger end effecter and the movable finger end effecter.

5. A micro-manipulator comprising a handling mechanism for gripping a micro-material, and a posture changing mechanism for orienting the handling mechanism,
    said handling mechanism comprising:
    a fixed finger with a fixed finger end effecter for touching the micro-material;
    a movable finger with a movable finger end effecter for touching the micro-material; and
    an actuator with a drive for moving the movable finger, wherein the drive moves a leading end of the movable finger end effecter so as to be capable of approaching a leading end of the fixed finger end effecter, thereby gripping the micro-material between the leading end of the fixed finger end effecter and the leading end of the movable finger end effecter, and
    said posture changing mechanism having means for rotating the movable finger end effecter leading end and the fixed finger end effecter leading end around the micro-material so that postures of the fixed finger end effecter and the movable finger end effecter are simultaneously rotated around the micro-material,
    wherein said means for rotating the handling mechanism includes a base having a curved guide rail, a slider slidably disposed on the curved guide rail to move along the curved guide rail, and a motor attached to the slider to move the slider along the curved guide rail, said handling mechanism being fixed to the slider to rotate along the curved guide rail, said curved guide rail having a center of curvature matching the leading ends of the end effectors so that when the slider moves along the curved guide rail, the end effectors rotate relative to the micro-material.

6. The micro-manipulator according to claim 5, wherein the handling mechanism includes mechanisms for adjusting the fixed finger and the movable finger in an X direction, a Y direction, and a Z direction, and the posture changing mechanism changes the fixed finger and the movable finger simultaneously in a θZ direction relative to the micro-material without changing the mechanisms for the X direction, the Y direction and the z direction.

7. A micro-manipulator with a handling mechanism for gripping a micro-material, the handling mechanism comprising:
- a fixed finger having a fixed finger end effecter with a leading end for touching the micro-material;
- a movable finger having a movable finger end effecter with a leading end for touching the micro-material, at least one of the leading ends of the fixed finger end effecter and the movable finger end effecter having an oblique flat surface with an oval shape for touching the micro-material;
- an adjustment mechanism formed at the fixed finger and the movable finger, said adjustment mechanism adjusting locations of the leading ends of the fixed finger end effecter and the movable finger end effecter and adjusting a posture of the oblique flat surface, with respect to the micro-material, formed at the at least one of the fixed finger end effecter and the movable finger end effecter so that the oblique surface substantially entirely contacts the micro-material; and
- an actuator with a drive for moving the movable finger, wherein the drive moves the leading end of the movable finger end effecter so as to be capable of approaching the leading end of the fixed finger end effecter, thereby gripping the micro-material between the leading ends of the fixed finger end effecter and the movable finger end effecter, wherein each of the fixed finger end effecter and the movable finger end effecter has an oblique flat surface with an oval shape, and at least one of the oblique flat surface of the fixed finger end effecter and the movable finger end effecter has a cavity or a hole therein to hold the micro-material between the leading ends of the fixed finger end effecter and the movable finger end effecter, and wherein the leading end of the movable finger end effecter is arranged to contact the leading end of the fixed finger end effecter.

* * * * *